US012763263B2

(12) United States Patent
Zeng et al.

(10) Patent No.: US 12,763,263 B2
(45) Date of Patent: Oct. 13, 2026

(54) CAPACITIVE ROCKER POTENTIOMETER

(71) Applicant: Guangdong Jinfu Intelligent Technology Co., Ltd, Dongguan (CN)

(72) Inventors: Guosheng Zeng, Dongguan (CN); Rong Tang, Dongguan (CN); Zhong Zeng, Dongguan (CN); Shengkai Huang, Dongguan (CN); Chengteng Liang, Dongguan (CN)

(73) Assignee: Guangdong Jinfu Intelligent Technology Co., Ltd, Dongguan (CN)

( * ) Notice: Subject to any disclaimer, the term of this patent is extended or adjusted under 35 U.S.C. 154(b) by 177 days.

(21) Appl. No.: 18/788,628

(22) Filed: Jul. 30, 2024

(65) Prior Publication Data

US 2025/0316423 A1 Oct. 9, 2025

(30) Foreign Application Priority Data

Apr. 9, 2024 (CN) ......................... 202410422656.6

(51) Int. Cl.

| | |
|---|---|
| ***H01G 5/04*** | (2006.01) |
| ***H01G 5/011*** | (2006.01) |
| ***H01G 5/013*** | (2006.01) |
| ***H01G 5/014*** | (2006.01) |

(52) U.S. Cl.

CPC ............... *H01G 5/04* (2013.01); *H01G 5/011* (2013.01); *H01G 5/0138* (2013.01); *H01G 5/014* (2013.01)

(58) Field of Classification Search

CPC ........ H01G 5/04; H01G 5/011; H01G 5/0138; H01G 5/014

USPC ............................................................ 341/33

See application file for complete search history.

(56) References Cited

U.S. PATENT DOCUMENTS

| | | | | |
|---|---|---|---|---|
| 4,574,286 A * | 3/1986 | Andresen | G01D 5/22 | 340/870.31 |
| 9,714,849 B2 * | 7/2017 | Biwersi | G01D 7/005 | |
| 2009/0276180 A1 * | 11/2009 | Schneider | G01D 5/58 | 356/614 |

(Continued)

FOREIGN PATENT DOCUMENTS

| | | | |
|---|---|---|---|
| CN | 116059624 A * | 5/2023 | A63F 13/24 |
| JP | H0626133 U * | 4/1994 | |

OTHER PUBLICATIONS

JP H0626133 U (Year: 1994).*
CN_116059624_A (Year: 2023).*

*Primary Examiner* — Zhen Y Wu
(74) *Attorney, Agent, or Firm* — Hemisphere Law, PLLC

(57) ABSTRACT

A capacitive rocker potentiometer includes a circuit board, a seat body, a slider, a rocker arm, a rocker rod, an insulation sheet, and a variable capacitor. The seat body is disposed on the circuit board and defines a sliding groove, the slider is disposed in the sliding groove of the seat body, and the slider is connected with the insulation sheet. The rocker arm is rotatably disposed on the seat body and is provided with a pulling head configured to slide the slider back and forth, and the rocker rod is connected to the rocker arm. The variable capacitor includes first and second electrode plates corresponding to each other, and the first and second electrode plates are electrically connected to the circuit board. The insulation sheet is inserted between the first and second electrode plates and configured to move back and forth between the first and second electrode plates.

11 Claims, 4 Drawing Sheets

(56) References Cited

U.S. PATENT DOCUMENTS

| | | | | |
|---|---|---|---|---|
| 2014/0077922 | A1* | 3/2014 | Horiguchi | H01C 10/103 338/12 |
| 2016/0041008 | A1* | 2/2016 | Wang | G01D 5/16 324/207.21 |
| 2024/0344854 | A1* | 10/2024 | Tu | G06F 3/0338 |

* cited by examiner

CAPACITIVE ROCKER POTENTIOMETER

CROSS-REFERENCE TO RELATED APPLICATION

This application claims priority to Chinese patent application No. CN 202410422656.6, filed to China National Intellectual Property Administration (CNIPA) on Apr. 9, 2024, which is herein incorporated by reference in its entirety.

TECHNICAL FIELD

The disclosure relates to the technical field of potentiometers, and particularly to a capacitive rocker potentiometer.

BACKGROUND

A rocker potentiometer is a type of variable potentiometer suitable for rocker control handles used in gaming consoles, unmanned aerial vehicles (UAV), and similar devices. By manipulating a rocker of the rocker potentiometer, and adjusting a resistance value through a wiper mechanism of the rocker potentiometer, state changes of internal components of the gaming consoles, UAV, etc. can be controlled. The structure of the rocker potentiometer can refer to Chinese patent with application No. 202221266852.1 and publication No. CN218384665U, which discloses a rocker potentiometer of center positioning sliding disc, and the rocker potentiometer of center positioning sliding disc includes a base, a sliding disc, a rocker, a lower rocker arm, an upper rocker arm, an iron shell, a first potentiometer assembly and a second potentiometer assembly. The base includes a cavity, the sliding disc is disposed in the cavity of the base, the rocker is disposed on the sliding disc, the iron shell is disposed outside the base, the lower rocker arm and the upper rocker arm are individually sleeved on the rocker, the upper rocker arm is located on an upper side of the lower rocker arm, and two ends of the lower rocker arm and two ends of the upper rocker arm extend outward the iron shell and the base; and the first potentiometer assembly and the second potentiometer assembly are disposed on the iron shell, an end of the lower rocker arm is rotatably inserted in the first potentiometer assembly, and an end of the upper rocker arm is rotatably inserted into the second potentiometer assembly. The structure of the first potentiometer assembly and the second potentiometer assembly of the above rocker potentiometer includes a resistive body and a rotating system or a sliding system, which means that a moving contact point moves on the resistive body to obtain partial voltage output. The potentiometer assemblies use a carbon film or a resistive wire structure, requiring the wiper contact point to frictionally contact the carbon film to achieve detection at different positions of the potentiometer. Therefore, shortcomings of the above potentiometer are as follows: (1) the carbon film has a short wear life and large production errors; (2) due to the friction of the wiper contact point, interference noise is generated when the position of the wiper contact point changes.

With the advancement of technology, electromagnetic induction rocker potentiometers that use Hall sensor chips are gradually developed and applied. These electromagnetic induction rocker potentiometers overcome the shortcomings of the contact-based potentiometers mentioned above. The electromagnetic induction rocker potentiometers use a permanent magnet as a rotating or sliding component and employ a linear Hall sensor to detect the position of the permanent magnet in real time. When adjusting the position, the electromagnetic induction rocker potentiometers have no contact, no wear, and no noise interference during adjustment. However, there are still some technical issues with electromagnetic induction rocker potentiometers that use Hall sensor chips as follows: (1) high power consumption, for example, under the voltage of 3 volts (V), the operating current of a typical carbon film brush-type potentiometer is about 300 microamperes (μA), while the operating current of a Hall sensor chip is 3 to 4 milliamperes (mA), which is more than 10 times the power consumption of the carbon film brush-type potentiometer; (2) poor anti-interference capability, the Hall sensor chips are susceptible to interference from external magnetic fields; (3) insufficient output accuracy of Hall sensor chips, the Hall sensor chips typically only achieve an 8-bit resolution; (4) The permanent magnet used in conjunction with the Hall sensor chip can gradually lose its magnetism over time, leading to potential demagnetization issues, which can result in poor performance of the electromagnetic induction potentiometer; (5) high cost of the Hall sensor chips, the cost of the Hall sensor chips is not conducive to reducing the overall cost of the rocker potentiometer.

In response to the problems associated with both carbon film brush-type rocker potentiometers and electromagnetic induction rocker potentiometers, capacitive rocker potentiometers have gradually emerged in the related art. As referring to the Chinese patent with publication No. CN116059624A, which disclose a rocker device, the rocker device includes a mounting base, a shell, a rocker, a circuit board, and a capacitive sensing assembly. The capacitive sensing assembly includes a first electrode and a second electrode arranged at intervals along a first direction, the circuit board and the capacitive sensing assembly are electrically connected, and the circuit board is configured to output corresponding position information based on a capacitance change between the first electrode and the second electrode. In addition, the first electrode is disposed on an upper rocker arm or a lower rocker arm, the second electrode is disposed on the circuit board, a side wall of a rocker handle abuts against the upper rocker arm or the lower rocker arm, which is configured to push the upper rocker arm or the lower rocker arm to rotate relative to the shell, thereby driving the first electrode connected to the upper rocker arm or the lower rocker arm to move, therefore a relative displacement occurs between the second electrode and the first electrode, and an overlapping area of the two electrodes along the first direction changes. The rocker device can output sensing information based on the change of the overlapping area between the second electrode and the first electrode, featuring the technical advantages of low power consumption, strong resistance to interference, and low cost.

However, the rocker device disclosed by the Chinese patent with publication No. CN116059624A has the shortcomings as follows. (1) The first electrode is disposed on the upper rocker arm or the lower rocker arm. During the rotation of the upper rocker arm or the lower rocker arm, it will drive the first electrode to move back and forth continuously. The back-and-forth movement of the first electrode inevitably produces vibration phenomenon, which can easily lead to slight changes in the distance between the first electrode and the second electrode, thereby causing errors in capacitance sensing, generating noise, and affecting the precision of the rocker device. (2) Since the circuit board is electrically connected to the capacitive sensing assembly, and the first electrode is disposed on the upper rocker arm or the lower rocker arm, there must be either a wired connection or a dynamic contact connection between the circuit board and the first electrode. When the wired connection is used between the circuit board and the first electrode, the wiring connection is very complicated, which affects the overall structure of the rocker device, and the wires move with the first electrode over time, which can easily lead to poor wiring connections. When the dynamic contact connection is used between the circuit board and the first electrode, the contact point can inevitably wear out after long-term movement and contact, and may even lead to poor contact issues.

SUMMARY

The technical issue in the disclosure is to overcome the shortcomings of the related art by providing a capacitive rocker potentiometer. In the capacitive rocker potentiometer, the first electrode plates and the second electrode plates of the variable capacitors do not experience relative displacement as the rocker arm rotates. Instead, the change in the capacitance of the variable capacitors is achieved through the movement of the insulation sheets of the sliders. This ensures that the capacitive rocker potentiometer not only has low power consumption, strong anti-interference capabilities, and a low cost, but also high accuracy and an exceptionally long lifespan.

To solve above problems, a capacitive rocker potentiometer is provided. The capacitive rocker potentiometer includes a circuit board, a seat body, a slider, a rocker arm, a rocker rod, an insulation sheet and a variable capacitor. The seat body is disposed on the circuit board, the seat body defines a sliding groove, the slider is disposed in the sliding groove of the seat body, and the slider is connected with the insulation sheet. The rocker arm is rotatably disposed on the seat body, the rocker arm is provided with a pulling head configured to slide the slider back and forth, and the rocker rod is connected to the rocker arm. The variable capacitor includes a first electrode plate and a second electrode plate corresponding to each other, the first electrode plate and second electrode plate are electrically connected to the circuit board. The insulation sheet is inserted between the first electrode plate and second electrode plate and capable of moving back and forth between the first electrode plate and second electrode plate. The insulation sheet is configured to change an area directly facing the first electrode plate and the second electrode plate during a movement of the insulation sheet, thereby to change a capacitance of the variable capacitor.

In an embodiment, a number of the second electrode plate of the variable capacitor is two, the two second electrode plates are arranged in parallel, and the first electrode plate faces towards the two second electrode plates. A part of the first electrode plate and one of the two second electrode plates form a variable capacitance member, and another part of the first electrode plate and the other one of the two second electrode plates form another variable capacitance member. The insulation sheet is configured to simultaneously change capacitances of the two variable capacitance members during the movement of the insulation sheet.

In an embodiment, the circuit board is provided with a sensor chip, the first electrode plate and the second electrode plate of the variable capacitor are electrically connected to the sensor chip. The sensor chip is configured to output a sensing signal based on the capacitance of the variable capacitor.

In an embodiment, the second electrode plate of the variable capacitor is attached on the circuit board, the first electrode plate of the variable capacitor is fixedly disposed on a lower side of the seat body and is located above the second electrode plate. An end of the first electrode plate is provided with an electrode contact point, the circuit board is provided with a circuit board contact point thereon, and the electrode contact point of the first electrode plate is electrically connected to the circuit board contact point.

In an embodiment, the first electrode plate defines multiple rivet holes thereon, the lower side of the seat body is provided with multiple rivet pins corresponding to the multiple rivet holes, and the multiple rivet pins are inserted from top to bottom into the multiple riveting holes and riveted to fix the first electrode plate.

In an embodiment, the first electrode plate is parallel to the second electrode plate, and a gap between the first electrode plate and the second electrode plate is in a range of 0.25 to 0.3 millimeters (mm). The insulation sheet is not in contact with the first electrode plate and the second electrode plate, and the insulation sheet is parallel to the first electrode plate and the second electrode plate. A distance between the insulation sheet and the first electrode plate or a distance between the insulation sheet and the second electrode plate remains unchanged during the movement of the insulation sheet.

In an embodiment, a number of the sliding groove defined on the seat body is two, and the two sliding grooves are respectively extended in a front-back direction and in a left-right direction, a number of the slider is two, and the two sliders are respectively disposed in the two sliding grooves. A number of the insulation sheet is two, and the two insulation sheets are respectively connected to the two sliders. The rocker arm includes an upper rocker arm and a lower rocker arm, the lower rocker arm is located below the upper rocker arm, a number of the pulling head is two, the two pulling heads are respectively provided on lower sides of ends of the upper rocker arm and the lower rocker arm, and the two pulling heads are cooperated with the two sliders, respectively. A number of the variable capacitor is two, one of the two variable capacitors is cooperated with the insulation sheet connected to one of the two sliders and the other one of the two variable capacitors is cooperated with the insulation sheet connected to the other one of the two sliders.

In an embodiment, the seat body defines a pressing hole, and a pressing block is slidably disposed in the pressing hole; the circuit board is provided with a pot pie button corresponding to the pressing block, and another end of the lower rocker arm is disposed to press and cooperate with the pressing block.

In an embodiment, the capacitive rocker potentiometer further includes a bottom shell, a sliding plate, a spring and an upper cover. The seat body defines a cavity, the sliding plate is disposed in the cavity of the seat body in a lifting manner, a cavity spring seat is disposed in the cavity of the seat body, and a lower side of the sliding plate is provided with a sliding plate spring seat. A lower end of the spring is disposed on the cavity spring seat, and an upper end of the spring is disposed below the sliding plate spring seat. Sides of the cavity of the seat body are connected with multiple guide feet, and inner walls of the multiple guide feet define guide slots; sides of the sliding plate are connected with guide bars corresponding to the guide slots and sliding together with the guide slots. The upper cover is fitted on the seat body, and the upper rocker arm and the lower rocker arm are disposed below the upper cover. The rocker rod passes through the upper cover and is connected to the upper rocker arm and the lower rocker arm, the bottom shell is disposed below the circuit board, an end of the bottom shell is provided with bottom shell connectors configured to connect the bottom shell to the upper cover.

In an embodiment, the upper rocker arm includes an upper rocker arm main body and two upper rocker arm rotation shafts connected to two ends of the upper rocker arm main body, one of the two upper rocker arm rotation shafts is integrally connected with the pulling head, and axle holes configured for rotating the two upper rocker arm rotation shafts are defined between the seat body and the upper cover. A center of the upper rocker arm main body defines an upper rocker arm central hole configured for the rocker rod to pass through, and an inner wall of the upper rocker arm central hole is rotatably connected to the rocker rod. The lower rocker arm includes a lower rocker arm main body and two lower rocker arm rotation shafts connected to two ends of the lower rocker arm main body, one of the two lower rocker arm rotation shafts is integrally connected with the pulling head, and the other one of the two lower rocker arm rotation shafts is pressed and cooperates with the pressing block. Axle holes configured for rotating the two lower rocker arm rotation shafts are defined between the seat body and the upper cover. A center of the lower rocker arm main body defines a lower rocker arm central hole configured for the rocker rod to pass through, and an inner wall of the lower rocker arm central hole is rotatably connected to the rocker rod.

The beneficial effects of the disclosure are as follows.

Since that the seat body is disposed on the circuit board, the seat body defines the sliding groove, the slider is disposed in the sliding groove of the seat body, the slider is connected with the insulation sheet, the rocker arm is rotatably disposed on the seat body, the rocker arm is provided with the pulling head configured to make the slider slide back and forth, and the rocker rod is connected to the rocker arm. Therefore, when the rocker rod rocks, it can rotate the rocker arm, which in turn causes the pulling head to swing, moving the slider and the insulation sheet back and forth. In addition, since that the variable capacitor includes the first electrode plate and the second electrode plate corresponding to the first electrode plate, the first electrode plate and the second electrode plate are electrically connected to the circuit board, the insulation sheet is inserted between the first electrode plate and the second electrode plate, and capable of moving back and forth between the first electrode plate and second electrode plate. That is to say, the first electrode plate and second electrode plate of the variable capacitor in the capacitive rocker potentiometer are stationary and do not undergo relative displacement with the rotation of the rocker arm. Instead, the movement of the insulation sheet of the slider is configured to change the area directly facing the first electrode plate and the second electrode plate, thereby changing the capacitance of the variable capacitor and enabling the capacitive rocker potentiometer to output the corresponding sensing signal. From this, the advantages of the capacitive rocker potentiometer are as follows.

(1) Low power consumption, for example, under the voltage of 3 V, the operating current of the capacitive rocker potentiometer of the disclosure is about 20 μA, while the operating current of the ordinary carbon film potentiometer is about 300 μA, and the operating current of the Hall sensor chip is 3 to 4 mA. The power consumption of the capacitive rocker potentiometer is less than 1/10 of the ordinary carbon film potentiometer and less than 1/100 of the Hall sensor chip; (2) Strong anti-interference capability, the variable capacitor is not affected by external magnetic fields; (3) Low cost, the cost of the variable capacitor is significantly lower than that of the Hall sensor chips and carbon film potentiometers; (4) High precision, the positions of the first electrode plate and the second electrode plate are stationary and unchanging, which can avoid the vibration phenomenon caused by the back and forth movement of the electrode plates. When the insulation sheet of the slider moves back and forth, it will not cause changes in the distance and position between the first electrode plate and the second electrode plate, which can avoid errors in capacitance sensing and the appearance of noise, making the precision of the capacitive rocker potentiometer of the disclosure very high; (5) Long service lifespan, on the one hand, because the insulation sheet of the sliders does not contact the first electrode plate and the second electrode plate, therefore, the insulation sheet of the slider will not cause friction damage to the first electrode plate and the second electrode plate during the back and forth movement. On the other hand, since the first electrode plate and the second electrode plate are stationary, the first electrode plate, the second electrode plate, and the circuit board can be directly soldered or connected by static contact points, abandoning the wire connection and the dynamic contact connection in the related art, making the service life of the capacitive rocker potentiometer of the disclosure very long.

DETAILED DESCRIPTION OF EMBODIMENTS

Figure 1:
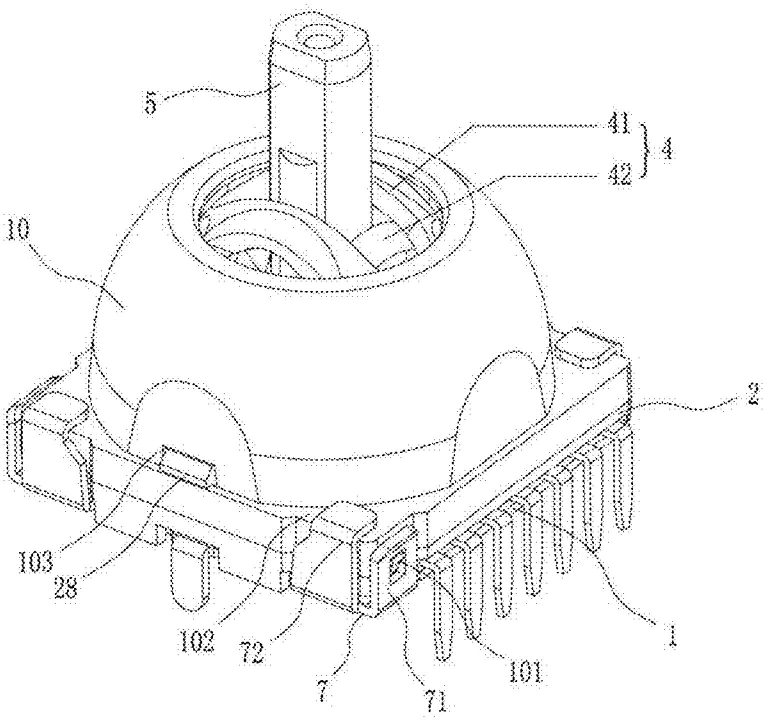
FIG. 1 illustrates an overall schematic structural diagram of a capacitive rocker potentiometer in the disclosure.
Figure 2:
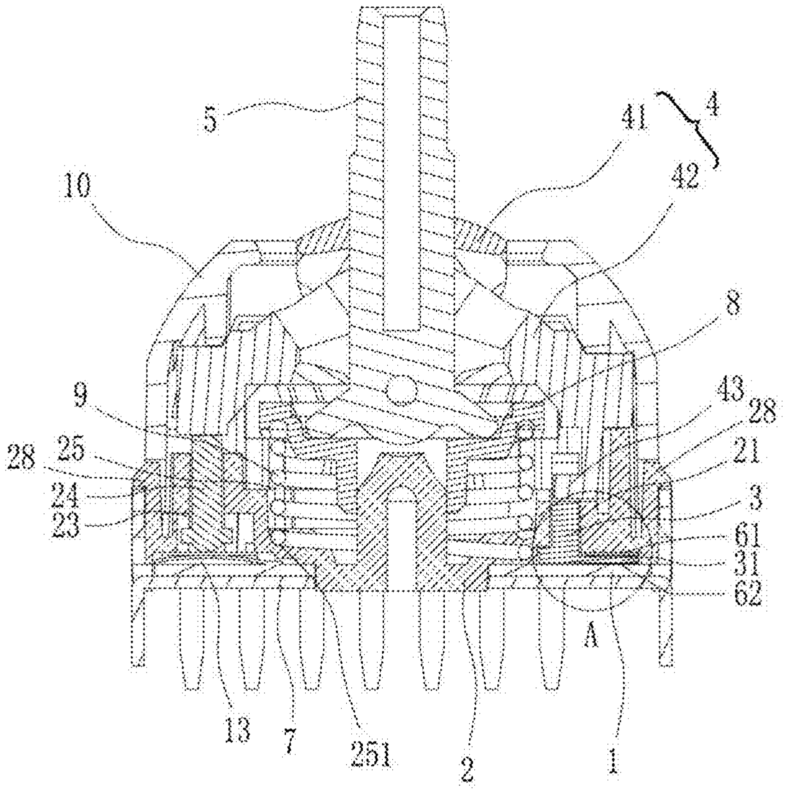
FIG. 2 illustrates a longitudinal sectional structural diagram of the capacitive rocker potentiometer in the disclosure.
Figure 3:
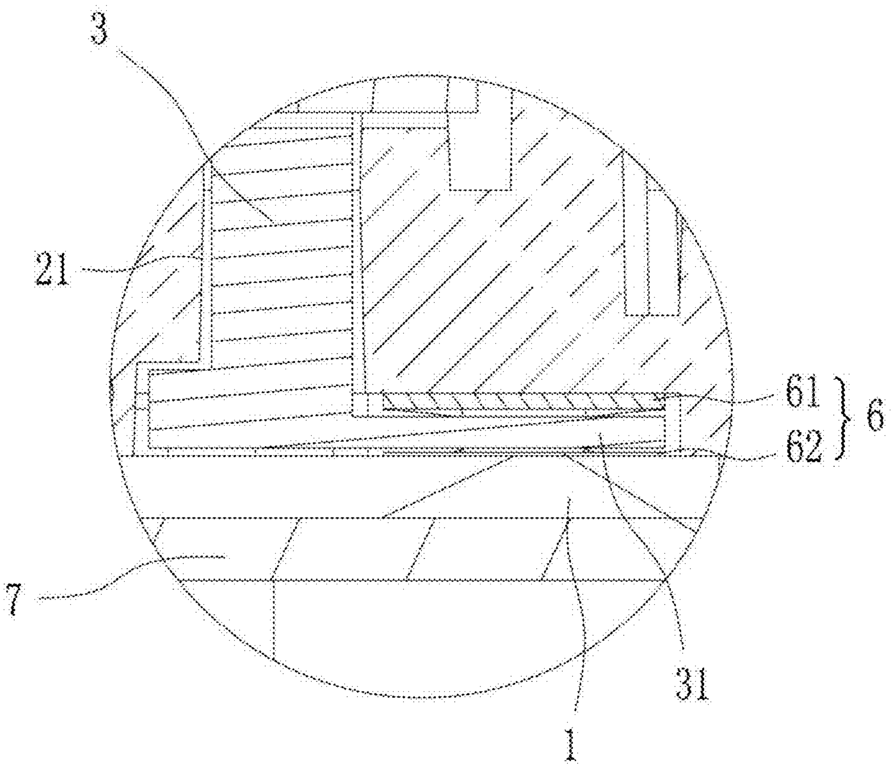
FIG. 3 illustrates an enlarged diagram of a portion A illustrated in FIG. 2 in the disclosure.

Further detailed explanation of the structural and working principles of the disclosure will be provided as follows in conjunction with the attached drawings.

As shown in FIGS. 1-6, a capacitive rocker potentiometer is provided. The capacitive rocker potentiometer includes a circuit board 1, a seat body 2, a slider 3, a rocker arm 4, a rocker rod 5, an insulation sheet 31 and a variable capacitor 6. The seat body 2 is disposed on the circuit board 1, the seat body 2 defines a sliding groove 21, the slider 3 is disposed in the sliding groove 21 of the seat body 2, and the slider 3 is connected with the insulation sheet 31. The rocker arm 4 is rotatably disposed on the seat body 2, the rocker arm 4 is provided with a pulling head 43 configured to slide the slider 3 back and forth, and the rocker rod 5 is connected to the rocker arm 4. The variable capacitor 6 includes a first electrode plate 61 and a second electrode plate 62 corresponding to the first electrode plate 61, the first electrode plate 61 and second electrode plate 62 are electrically connected to the circuit board 1. The insulation sheet 31 is inserted between the first electrode plate 61 and second electrode plate 62 and capable of moving back and forth between the first electrode plate 61 and second electrode plate 62. The insulation sheet 31 is configured to change an area directly facing the first electrode plate 61 and the second electrode plate 62 during a movement of the insulation sheet 31, thereby to change a capacitance of the variable capacitor 6. The capacitance is a very important physical quantity in a circuit, which is closely related to the dielectric constant. The dielectric constant is a physical quantity that represents the capacitance storage capacity of insulation materials relative to vacuum, and the capacitance is a measure of the store ability of charges. The dielectric constant can be calculated using the following formula: $\varepsilon=C/C0$, where C represents the capacitance of the substance, and C0 represents the capacitance in the vacuum. From the formula for calculating the dielectric constant, it can be seen that the dielectric constant is directly proportional to the capacitance. The dielectric constants of different media vary greatly, which is because the different media have different electric field strengths and molecular structures. When the medium between the two electrode plates of the capacitor changes, the dielectric constant will change, and the capacitance will also change accordingly. The disclosure utilizes this principle. When the insulation sheet 31 moves back and forth between the first electrode plate 61 and the second electrode plate 62, the area of the indirect face that is insulated by the insulation sheet 31 between the first electrode plate 61 and the second electrode plate 62 will change, and the area of the direct face that is not insulated by the insulation sheet 31 between the first electrode plate 61 and the second electrode plate 62 will also change. Furthermore, since the dielectric constant of the insulation sheet 31 is significantly different from that of air (the dielectric constant of the insulation sheet is significantly greater than that of the air), when the area directly facing the first electrode plate and the second electrode plate changes, the capacitance of the variable capacitor 6 will also change accordingly.

When the rocker rod 5 is rocked, it can rotate the rocker arm 4, the rocker arm 4 can drive the pulling head 43 to swing, thereby moving the slider 3 and the insulation sheet 31 back and forth. In addition, since that the variable capacitor 6 includes the first electrode plate 61 and the second electrode plate 62 corresponding to the first electrode plate 61, the first electrode plate 61 and the second electrode plate 62 are electrically connected to the circuit board 1, the insulation sheet 31 is inserted between the first electrode plate 61 and the second electrode plate 62 and capable of moving back and forth between the first electrode plate 61 and the second electrode plate 62. That is to say, the first electrode plate 61 and the second electrode plate 62 of the variable capacitor 6 in the capacitive rocker potentiometer are stationary and do not undergo relative displacement with the rotation of the rocker arm 4. Instead, the movement of the insulation sheet 31 of the slider 3 is configured to change the capacitance of the variable capacitor 6, thereby enabling the capacitive rocker potentiometer to output the corresponding sensing signal. From this, the advantages of the capacitive rocker potentiometer are as follows: (1) Low power consumption, for example, under the voltage of 3 V, the operating current of the capacitive rocker potentiometer is about 20 μA, while the operating current of the ordinary carbon film potentiometer is about 300 μA, and the operating current of the Hall sensor chip is 3 to 4 mA. The power consumption of the capacitive rocker potentiometer is less than 1/10 of the carbon film potentiometer and less than 1/100 of the Hall sensor chip; (2) Strong anti-interference capability, the variable capacitor 6 is not affected by external magnetic fields; (3) Low cost, the cost of the variable capacitors 6 is significantly lower than that of the Hall sensor chips and carbon film potentiometers; (4) High precision, the positions of the first electrode plate 61 and the second electrode plate 62 are stationary and unchanging, which can avoid the vibration phenomenon caused by the back and forth movement of the electrode plates. When the insulation sheet 31 of the slider 3 moves back and forth, it will not cause changes in the distance and position between the first electrode plate 61 and the second electrode plate 62, which can avoid errors in capacitance sensing and the appearance of noise, making the precision of the capacitive rocker potentiometer very high; (5) Long service lifespan, on the one hand, because the insulation sheet 31 of the slider 3 does not contact the first electrode plate 61 and the second electrode plate 62, therefore, the insulation sheet 31 of the slider 3 will not cause friction damage to the first electrode plate 61 and the second electrode plate 62 during the back and forth movement. On the other hand, since the first electrode plate 61 and the second electrode plate 62 are stationary, the first electrode plate 61, the second electrode plate 62, and the circuit board 1 can be directly soldered or connected by static contact points, abandoning the wire connection and the dynamic contact connection in the related art, making the service life of the capacitive rocker potentiometer very long.

Figure 4:
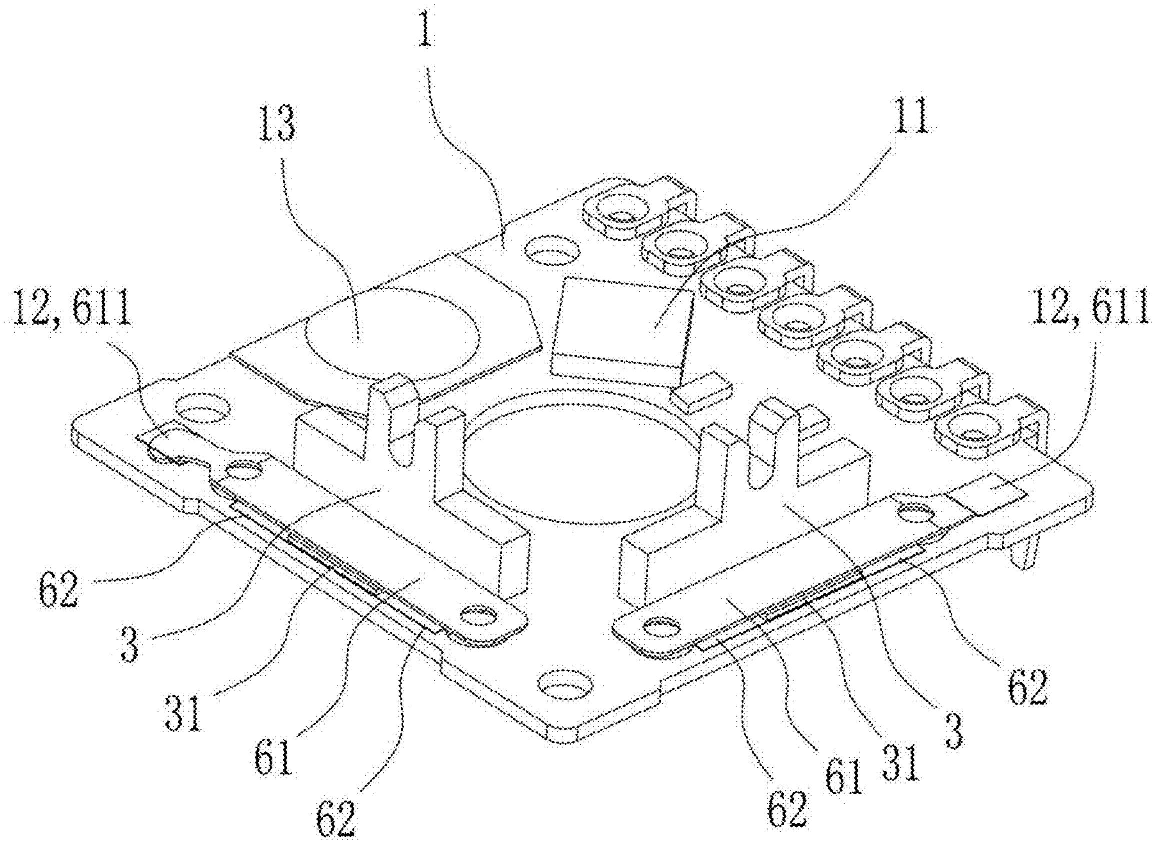
FIG. 4 illustrates a schematic structural diagram of a circuit board, variable capacitors, sliders and insulation sheets in the disclosure.
Figure 5:
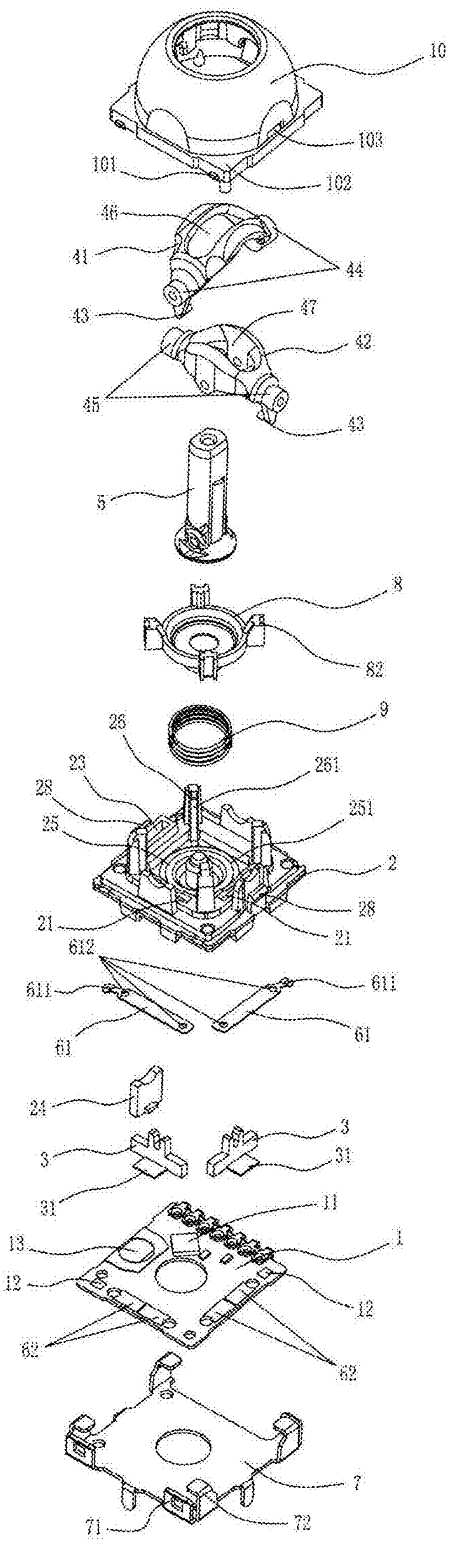
FIG. 5 illustrates a first explosive schematic structural diagram of the capacitive rocker potentiometer in the disclosure.
Figure 6:
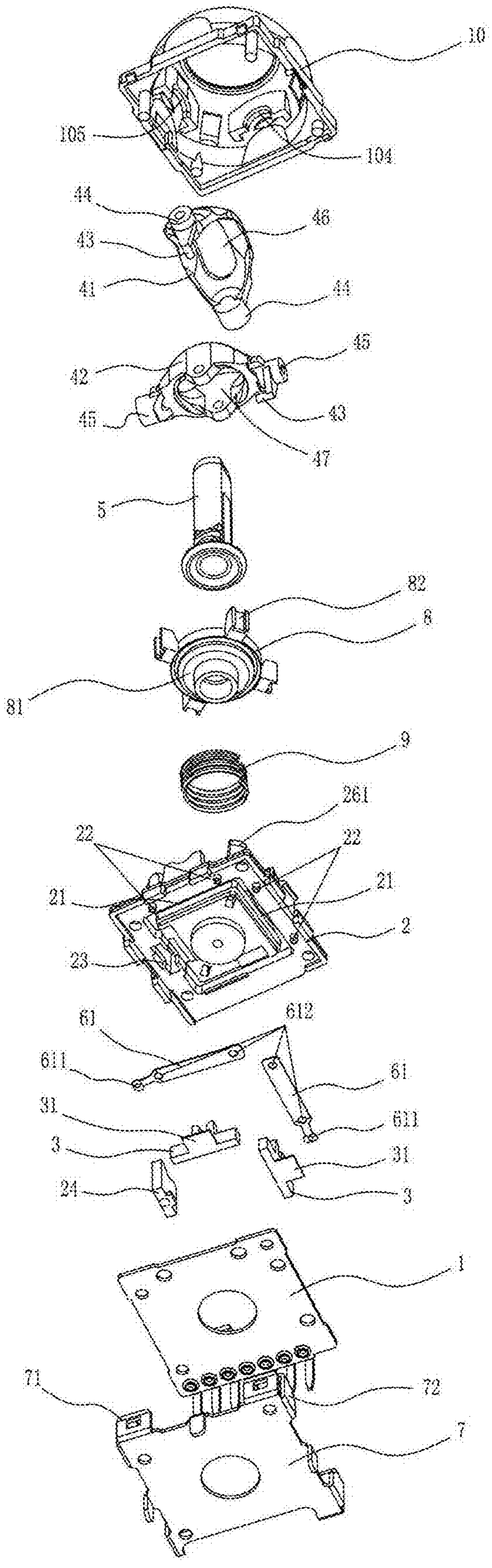
FIG. 6 illustrates a second explosive schematic structural diagram of the capacitive rocker potentiometer in the disclosure.

As shown in FIGS. 4-6, a number of the second electrode plate 62 of the variable capacitor 6 is two, the two second electrode plates 62 are arranged in parallel, a gap is between the two second electrode plates 62, and the first electrode plate 61 faces towards the two second electrode plates 62. A part of the first electrode plate 61 and one of the two second electrode plates 62 form a variable capacitance member, and another part of the first electrode plate 61 and another one of the two second electrode plates 62 form another variable capacitance member. The insulation sheet 31 is configured to simultaneously change capacitances of the two variable capacitance members during the movement of the insulation sheets 31. As shown in FIG. 4, the first electrode plate 61 includes a first end and a second end, one of the two second electrode plates 62 is located below the first end of the first electrode plate 61, and the other one of the two second electrode plates 62 is located below the second end of the first electrode plate 61. The two second electrode plates 62 are separated by the gap, and a length of the insulation sheet 31 is equivalent to ¼ to ½ of a length of the first electrode plate 61. When the insulation sheet 31 moves horizontally towards the first end of the first electrode plate 61, the area directly facing the first electrode plate 61 and the second electrode plate 62 below the first end of the first electrode plate 61 will gradually decrease, while the area directly facing the first electrode plate 61 and the second electrode plate 62 below the second end of the first electrode plate 61 will gradually increase. Conversely, when the insulation sheet 31 moves horizontally towards the second end of the first electrode plate 61, the area directly facing the first electrode plate 61 and the second electrode plate 62 below the first end of the first electrode plate 61 will gradually increase, while the area directly facing the first electrode plate 61 and the second electrode plate 62 below the second end of the first electrode plate 61 will gradually decrease. It can be seen that the insulation sheets 31 can simultaneously change the capacitances of the two variable capacitance members during the back and forth movement of the insulation sheet 31. Through the simultaneous sensing of the two variable capacitance members, the sensitivity and accuracy of the sensing can be significantly improved.

As shown in FIGS. 4-6, the circuit board 1 is provided with a sensor chip 11, the first electrode plate 61 and the second electrode plates 62 of the variable capacitor 6 are electrically connected to the sensor chip 11. The sensor chip 11 is configured to output an appropriate sensing signal based on the capacitances of variable capacitance members. Preferably, an amplifier circuit is disposed between the variable capacitor 6 and the sensor chip 11 to amplify the voltage signal transmitted from the variable capacitor 6 to the sensor chip 11.

As shown in FIGS. 2-6, the second electrode plates 62 of the variable capacitor 6 are attached on the circuit board 1, the first electrode plate 61 of the variable capacitor 6 is fixedly disposed on a lower side of the seat body 2 and is located above the second electrode plates 62. An end of the first electrode plate 61 is provided with an electrode contact point 611, the circuit board 1 is provided with a circuit board contact point 12 thereon, and the electrode contact point 611 of the first electrode plate is electrically connected to the circuit board contact point 12. The first electrode plate 61 of the variable capacitor 6 defines multiple rivet holes 612 thereon, the lower side of the seat body 2 is provided with multiple rivet pins 22 corresponding to the multiple rivet holes 612, and the multiple rivet pins 22 are inserted from top to bottom into the multiple riveting holes 612 and riveted to fix the first electrode plate 61. In this way, the first electrode plate 61 can be fixedly disposed through the seat body 2, and the first electrode plate 61 and the circuit board 1 can be stably connected through the contact of the electrode plate contact point 611 with the circuit board contact point 12. Preferably, the electrode plate contact point 611 of the first electrode plate 61 is an elastic structure that can press elastically against the circuit board contact point 12, thereby optimally enhancing the stability of the electrical connection.

As shown in FIGS. 2-6, the first electrode plate 61 and the second electrode plate 62 of the variable capacitor 6 are parallel to each other, and a gap between the first electrode plate 61 and the second electrode plate 62 of the variable capacitor 6 is in a range of 0.25 to 0.3 mm. The insulation sheet 31 is not in contact with the first electrode plate 61 and the second electrode plate 62, and the insulation sheet 31 is parallel to the first electrode plate 61 and the second electrode plate 62. A distance between the insulation sheet 31 and the first electrode plate 61 or a distance between the insulation sheet 31 and the second electrode plate 62 of the variable capacitor 6 remain unchanged during the movement of the insulation sheets 31.

As shown in FIGS. 2-6, a number of the sliding groove 21 defined on the seat body 2 is two, and the two sliding grooves 21 are respectively extended in a front-back direction and a slot in a left-right direction. A number of the slider 3 is two, and the two sliders 3 are respectively disposed in the two sliding grooves 21. A number of the insulation sheet 31 is two, and the two insulation sheets 31 are respectively connected to the two sliders 3. The rocker arm 4 includes an upper rocker arm 41 and a lower rocker arm 42, the lower rocker arm 42 is located below the upper rocker arm 41, a number of the pulling head 43 is two, the two pulling heads 43 are respectively provided on lower sides of ends of the upper rocker arm 41 and the lower rocker arm 42, and the two pulling heads 43 are cooperated with the two sliders 3, respectively. A number of the variable capacitor 6 is two, one of the two variable capacitors 6 is cooperated with the insulation sheet 31 connected to one of the two sliders 3 and the other one of the two variable capacitors 6 is cooperated with the insulation sheet 31 connected to the other one of the two sliders 3.

As shown in FIGS. 2 and 4-6, the seat body 2 defines a pressing hole 23, and a pressing block 24 is slidably disposed in the pressing hole 23. The circuit board 1 is provided with a pot pie button 13 corresponding to the pressing block 24, and another end of the lower rocker arm 42 is disposed to press and cooperate with the pressing block 24.

As shown in FIGS. 1, 2 and 4-6, the capacitive rocker potentiometer further includes a bottom shell 7, a sliding plate 8, a spring 9 and an upper cover 10. The seat body 2 defines a cavity 25, the sliding plate 8 is disposed in the cavity 25 of the seat body 2 in a lifting manner, a cavity spring seat 251 is disposed in the cavity 25 of the seat body 2, and a lower side of the sliding plate 8 is provided with a sliding plate spring seat 81. A lower end of the spring 9 is disposed on the cavity spring seat 251, and an upper end of the spring 9 is disposed below the sliding plate spring seat 81. Sides of the cavity 25 of the seat body 2 are connected with multiple guide feet 26, and inner walls of the multiple guide feet 26 define guide slots 261; sides of the sliding plate 8 are connected with guide bars 82 corresponding to the guide slots 261 and sliding together with the guide slots 261. The upper cover 10 is fitted on the seat body 2, and the upper rocker arm 41 and the lower rocker arm 42 are disposed below the upper cover 10. The rocker rod 5 passes through the upper cover 10 and is connected to the upper rocker arm 41 and the lower rocker arm 42, the bottom shell 7 is disposed below the circuit board 1, an end of the bottom shell 7 is provided with bottom shell connectors configured to connect the bottom shell 7 to the upper cover 10, and the bottom shell connectors may include snap rings 71 and eared buckles 72.

As shown in FIGS. 1, 2 and 4-6, the upper rocker arm 41 includes an upper rocker arm main body and two upper rocker arm rotation shafts 44 connected to two ends of the upper rocker arm main body, one of the two upper rocker arm rotation shafts 44 is integrally connected with the pulling head 43, and axle holes 104 configured for rotating the two upper rocker arm rotation shafts 44 are defined between the seat body 2 and the upper cover 10. A center of the upper rocker arm main body defines an upper rocker arm central hole 46 configured for the rocker rod 5 to pass through, and an inner wall of the upper rocker arm central hole 46 is rotatably connected to the rocker rod 5. The lower rocker arm 42 includes a lower rocker arm main body and two lower rocker arm rotation shafts 46 connected to two ends of the lower rocker arm main body, one of the two lower rocker arm rotation shafts 46 is integrally connected with the pulling head 43, and the other one of the two lower rocker arm rotation shafts 46 is pressed and cooperates with the pressing block 24. Axle holes 105 configured for rotating the two lower rocker arm rotation shafts 46 are defined between the seat body 2 and the upper cover 10. A center of the lower rocker arm main body defines a lower rocker arm central hole 47 configured for the rocker rod 5 to pass through, and an inner wall of the lower rocker arm central hole 47 is rotatably connected to the rocker rod 5.

As shown in FIGS. 1-2 and 5-6, the bottom shell 7 includes upwardly extending snap rings 71 and eared buckles 72 at two ends of the bottom shell 7, two ends of the upper cover 10 are provided with snap heads 101 and buckle tables 102, and the snap rings 71 are snapped with the snap heads 101, and the eared buckles 72 are bent and buckled onto the buckle tables 102. The two ends of the seat body 2 are provided with upwardly extending snap hooks 28, the two ends of the upper cover 10 are defined with snap holes 103, and the snap hooks 28 are snapped into the snap holes 103.

The above is only the preferred embodiment of the disclosure. Any minor modifications, equivalent changes, and amendments made to the above embodiments based on the technical solution of the disclosure are within the scope of the technical solution of the disclosure.

What is claimed is:

1. A capacitive rocker potentiometer, comprising:

a circuit board;

a seat body, disposed on the circuit board, wherein the seat body defines a sliding groove, a slider, slidably disposed in the sliding groove of the seat body;

an insulation sheet, connected with the slider;

a rocker arm, rotatably disposed on the seat body, wherein the rocker arm is provided with a pulling head configured to slide the slider back and forth;

a rocker rod, connected to the rocker arm; and a variable capacitor, comprising a first electrode plate and a second electrode plate corresponding to the first electrode plate, wherein the first electrode plate and the second electrode plate are electrically connected to the circuit board, the insulation sheet is inserted between the first electrode plate and the second electrode plate, and capable of moving back and forth between the first electrode plate and the second electrode plate, and the insulation sheet is configured to change an area directly facing the first electrode plate and the second electrode plate during movement of the insulation sheet, thereby to change a capacitance of the variable capacitor; and wherein the first electrode plate is parallel to the second electrode plate, and a gap between the first electrode plate and the second electrode plate is in a range of 0.25 to 0.3 millimeters (mm); the insulation sheet is not in contact with the first electrode plate and the second electrode plate, and the insulation sheet is parallel to the first electrode plate and the second electrode plate; and a distance between the insulation sheet and the first electrode plate or a distance between the insulation sheet and the second electrode plate remains unchanged during the movement of the insulation sheet.

2. The capacitive rocker potentiometer as claimed in claim 1, wherein a number of the second electrode plate of the variable capacitor is two, the two second electrode plates are arranged in parallel, and the first electrode plate faces towards the two second electrode plates; a part of the first electrode plate and one of the two second electrode plates form a variable capacitance member, another part of the first electrode plate and the other one of the two second electrode plates form another variable capacitance member, and the insulation sheet is configured to simultaneously change capacitances of the two variable capacitance members during the movement of the insulation sheet.

3. The capacitive rocker potentiometer as claimed in claim 1, wherein the circuit board is provided with a sensor chip, the first electrode plate and the second electrode plate of the variable capacitor are electrically connected to the sensor chip, and the sensor chip is configured to output a sensing signal based on the capacitance of the variable capacitor.

4. The capacitive rocker potentiometer as claimed in claim 1, wherein the second electrode plate of the variable capacitor is attached on the circuit board, the first electrode plate of the variable capacitor is fixedly disposed on a lower side of the seat body and is located above the second electrode plate, an end of the first electrode plate is provided with an electrode contact point, the circuit board is provided with a circuit board contact point thereon, and the electrode contact point of the first electrode plate is electrically connected to the circuit board contact point.

5. The capacitive rocker potentiometer as claimed in claim 4, wherein the first electrode plate defines a plurality of rivet holes thereon, the lower side of the seat body is provided with a plurality of rivet pins corresponding to the plurality of rivet holes, and the plurality of rivet pins are inserted from top to bottom into the plurality of riveting holes and riveted to fix the first electrode plate.

6. The capacitive rocker potentiometer as claimed in claim 1, wherein a number of the sliding groove defined on the seat body is two, and the two sliding grooves are respectively extended in a front-back direction and a left-right direction; a number of the slider is two, and the two sliders are respectively disposed in the two sliding grooves; a number of the insulation sheet is two, and the two insulation sheets are respectively connected to the two sliders; the rocker arm comprises an upper rocker arm and a lower rocker arm, the lower rocker arm is located below the upper rocker arm, a number of the pulling head is two, the two pulling heads are respectively provided on lower sides of ends of the upper rocker arm and the lower rocker arm, and the two pulling heads are cooperated with the two sliders, respectively; and a number of the variable capacitor is two, one of the two variable capacitors is cooperated with the insulation sheet connected to one of the two sliders and the other one of the two variable capacitors is cooperated with the insulation sheet connected to the other one of the two sliders.

7. The capacitive rocker potentiometer as claimed in claim 6, wherein the seat body defines a pressing hole, and a pressing block is slidably disposed in the pressing hole; the circuit board is provided with a pot pie button corresponding to the pressing block, and another end of the lower rocker arm is disposed to press and cooperate with the pressing block.

8. The capacitive rocker potentiometer as claimed in claim 6, further comprising: a bottom shell, a sliding plate, a spring and an upper cover;

wherein the seat body defines a cavity, the sliding plate is disposed in the cavity of the seat body in a lifting manner, a cavity spring seat is disposed in the cavity of the seat body, and a lower side of the sliding plate is provided with a sliding plate spring seat; a lower end of the spring is disposed on the cavity spring seat, and an upper end of the spring is disposed below the sliding plate spring seat; sides of the cavity of the seat body are connected with a plurality of guide feet, and inner walls of the plurality of guide feet respectively define guide slots; sides of the sliding plate are connected with guide bars corresponding to the guide slots and sliding together with the guide slots; the upper cover is fitted on the seat body, and the upper rocker arm and the lower rocker arm are disposed below the upper cover; the rocker rod passes through the upper cover and is connected to the upper rocker arm and the lower rocker arm, the bottom shell is disposed below the circuit board, and an end of the bottom shell is provided with bottom shell connectors configured to connect the bottom shell to the upper cover.

9. The capacitive rocker potentiometer as claimed in claim 8, wherein the upper rocker arm comprises an upper rocker arm main body and two upper rocker arm rotation shafts connected to two ends of the upper rocker arm main body, one of the two upper rocker arm rotation shafts is integrally connected with the pulling head, axle holes configured for rotating the two upper rocker arm rotation shafts are defined between the seat body and the upper cover; a center of the upper rocker arm main body defines an upper rocker arm central hole configured for the rocker rod to pass through, and an inner wall of the upper rocker arm central hole is rotatably connected to the rocker rod; the lower rocker arm comprises an lower rocker arm main body and two lower rocker arm rotation shafts connected to two ends of the lower rocker arm main body, one of the two lower rocker arm rotation shafts is integrally connected with the pulling head, and the other one of the two lower rocker arm rotation shafts is pressed and cooperates with the pressing block; axle holes configured for rotating the two lower rocker arm rotation shafts are defined between the seat body and the upper cover; a center of the lower rocker arm main body defines a lower rocker arm central hole configured for the rocker rod to pass through, and an inner wall of the lower rocker arm central hole is rotatably connected to the rocker rod.

10. The capacitive rocker potentiometer as claimed in claim 8, wherein the bottom shell comprises upwardly extending snap rings and eared buckles at two ends of the bottom shell, two ends of the upper cover are provided with snap heads and buckle tables, and the snap rings are snapped with the snap heads, and the eared buckles are bent and buckled onto the buckle tables.

11. The capacitive rocker potentiometer as claimed in claim 8, wherein the two ends of the seat body are provided with upwardly extending snap hooks, two ends of the upper cover are defined with snap holes, and the snap hooks are snapped into the snap holes.

* * * * *